United States Patent Office 3,647,655
Patented Mar. 7, 1972

3,647,655
PROCESS FOR THE PREPARATION OF
LUMILYSERGIC ACID DERIVATIVES
Luigi Bernardi, Milan, Germano Bosisio, Palazzolo Milanese, and Aldemio Temperilli, Milan, Italy, assignors to Societá Farmaceutici Italia, Milan, Italy
No Drawing. Filed May 12, 1970, Ser. No. 36,661
Claims priority, application Italy, May 13, 1969,
16,762/69
Int. Cl. B01j 1/10
U.S. Cl. 204—158          7 Claims

ABSTRACT OF THE DISCLOSURE

A process for preparing lumilysergic acid derivatives of the formula

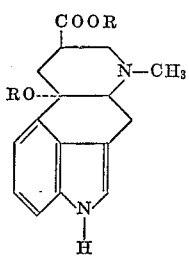

wherein R is a lower alkyl radical containing from 1 to 4 carbon atoms. The process comprises reacting the lysergic acid with a lower aliphatic alcohol containing from 1 to 4 carbon atoms in the presence of light and of a mineral acid. The light source is preferably a U.V. ray lamp. The mineral acid is preferably sulphuric acid.

---

Our invention relates to the preparation of lumilysergic acid derivatives. We prepare 8-esters-10-ethers of the lumilysergic acid, which are starting products of pharmacologically active compounds, described in U.S. Pat. No. 3,228,943.

Our process consists in reacting lysergic acid with a lower aliphatic alcohol containing from 1 to 4 carbon atoms in the presence of light and of a mineral acid, for example sulphuric or perchloric acid. This reaction causes the addition of a hydrogen atom and of an alkoxy radical to the two carbon atoms linked by double bond in position 9 and 10 respectively while a second alkoxy radical esterifies the acyl group in position 8.

The reaction may be illustrated thereby:

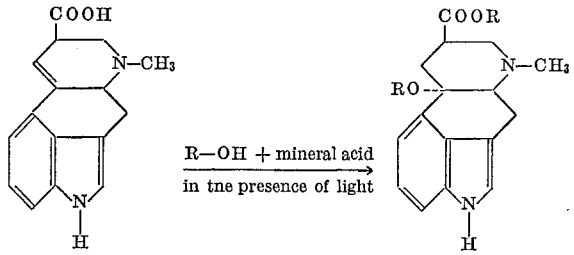

where R is a lower alkyl radical containing from 1 to 4 carbon atoms. A U.V. ray lamp or the sunlight may be used as source of light. Good results are obtained employing either a 250 watts Philips-HPLR or Hanau PL 321 lamp. The time required for the photochemical reaction may vary considerably according to the concentration of the mineral acid used, the light intensity and the temperature. A greater concentration of the mineral acid used corresponds to a higher reaction speed. The speed is also proportional to the intensity of the irradiated light. The reaction is carried out at a temperature of from 0 to 40° C., preferably from 10° C. to room temperature.

When the reaction is over; and this may be evidenced by the disappearance in the adsorption spectrum of the maximum, at 315 m$\mu$, which is characteristic of the lysergic derivatives; the mixture is made alkaline with ammonia and then extracted with a solvent immiscible with water, such as, for example, ethyl acetate or chloroform. Afterwards, the solvent is removed by evaporation and the 8-ester-10-ether of the lumilysergic acid is crystallized from a suitable solvent.

The following example is to illustrate the invention without limiting it.

EXAMPLE 8-methyl-ester-10-methyl-ether of the lumilysergic acid 1.5 grams of lysergic acid monohydrate were dissolved in 40 cc. of methanol and 7.5 cc. of sulphuric acid. The resulting mixture was irradiated in a Pyrex flask with a 250 watts Philips-HPLR lamp. When the reaction was over, it was diluted with water, made alkaline with ammonia and extracted with chloroform. By evaporating off the solvent and crystallizing from ethyl ether, 1.1 g. of the 8-methyl-ester-10-methyl-ether of the lumilysergic acid melting at 181–183° C. were obtained; $[\alpha]_D^{20°}=0°$ (c.=0.47 in pyridine).

Operating as described above, but using, in lieu of methanol, other lower aliphatic alcohols such as ethanol, propanol and butanol, the corresponding 8-ester-10-ether derivatives are obtained.

We claim:
1. A process for preparing lumilysergic acid derivatives of the formula

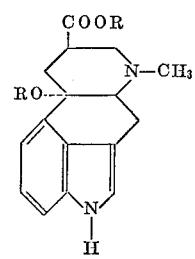

wherein R is a lower alkyl radical containing from 1 to 4 carbon atoms, which comprises reacting the lysergic acid with a lower aliphatic alcohol containing from 1 to 4 carbon atoms in the presence of light and of a mineral acid.
2. The process of claim 1, wherein the light source is a U.V. ray lamp.
3. The process of claim 1, wherein the mineral acid is sulphuric acid.
4. The process of claim 1, wherein the lower aliphatic alcohol is methanol.
5. The process of claim 1, wherein the lower aliphatic alcohol is ethanol.
6. The process of claim 1, wherein the lower aliphatic alcohol is propanol.
7. The process of claim 1, wherein the lower aliphatic alcohol is butanol.

References Cited
UNITED STATES PATENTS
3,462,438    8/1969    Loev _____ 204—158

HOWARD S. WILLIAMS, Primary Examiner